US012632705B2

(12) United States Patent
Mehr et al.

(10) Patent No.: US 12,632,705 B2
(45) Date of Patent: May 19, 2026

(54) ADVERSARIAL 3D DEFORMATIONS LEARNING

(71) Applicant: DASSAULT SYSTEMES, Velizy Villacoublay (FR)

(72) Inventors: Eloi Mehr, Velizy-Villacoublay (FR); Ariane Jourdan, Velizy-Villacoublay (FR); Paul Jacob, Le Vesinet (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 1129 days.

(21) Appl. No.: 17/646,082

(22) Filed: Dec. 27, 2021

(65) Prior Publication Data

US 2022/0245431 A1 Aug. 4, 2022

(30) Foreign Application Priority Data

Jan. 29, 2021 (EP) ..................................... 21305132

(51) Int. Cl.
*G06N 3/047* (2023.01)
*G06N 3/045* (2023.01)
*G06N 3/08* (2023.01)

(52) U.S. Cl.
CPC ............. *G06N 3/047* (2023.01); *G06N 3/045* (2023.01); *G06N 3/08* (2013.01)

(58) Field of Classification Search
None
See application file for complete search history.

(56) References Cited

U.S. PATENT DOCUMENTS

| | | | |
|---|---|---|---|
| 2003/0070660 A1 | 4/2003 | Threadingham et al. | |
| 2017/0193699 A1* | 7/2017 | Mehr ...................... | G06F 17/10 |
| 2020/0210814 A1* | 7/2020 | Mehr ...................... | G06N 3/088 |
| 2021/0004719 A1 | 1/2021 | Dupont De Dinechin | |

FOREIGN PATENT DOCUMENTS

| | | |
|---|---|---|
| EP | 3 859 610 A1 | 8/2021 |
| EP | 3 872 771 A1 | 9/2021 |

OTHER PUBLICATIONS

Li et al.- GRASS: Generative Recursive Autoencoders for Shape Structures', ACM Transactions on Graphics, vol. 36, No. 4, Article 52, Publication Date: Jul. 2017 SIGGRAPH (Year: 2017).*
Volker Blanz and Thomas Vetter. 1999. A morphable model for the synthesis of 3D faces. In Proceedings of the 26th annual conference on Computer graphics and interactive techniques (SIGGRAPH '99). ACM Press/Addison-Wesley Publishing Co., USA, 187-194. https://doi.org/10.1145/311535.311556 (Year: 1999).*

(Continued)

*Primary Examiner* — Usmaan Saeed
*Assistant Examiner* — Alvaro S Laham Bauzo
(74) *Attorney, Agent, or Firm* — Oblon, McClelland, Maier & Neustadt, L.L.P.

(57) ABSTRACT

A computer-implemented method of machine-learning. The method includes obtaining a dataset of 3D modeled objects representing real-world objects. The method further includes learning, based on the dataset, a generative neural network. The generative neural network is configured for generating a deformation basis of an input 3D modeled object. The learning includes an adversarial training.

19 Claims, 5 Drawing Sheets

Input x · Shape encoder f · Basic decoder g · Deformation basis $(B_1, ..., B_n)$ · $P_{real}$ · Discriminator d Random sampler $\alpha = \begin{pmatrix} \alpha_1 \\ \vdots \\ \alpha_n \end{pmatrix}$ $B\alpha$ $\alpha_1 \begin{pmatrix} \vdots \end{pmatrix} + \alpha_2 \begin{pmatrix} \vdots \end{pmatrix} + ... + \alpha_n \begin{pmatrix} \vdots \end{pmatrix}$ $y = x + \sum_{j=1}^{n} \alpha_j B_j (x)$ Synthetic shape $P_{synthetic}$ · Discriminator d

(56) References Cited

OTHER PUBLICATIONS

Mehr, et al., "DiscoNet: Shapes Learning on Disconnected Manifolds for 3D Editing," 2019 IEEE/CVF International Conference on Computer Vision (ICCV), Seoul, Korea (South), 2019, pp. 3473-3482, doi: 10.1109/ICCV.2019.00357. (Year: 2019).*

Ariano, "Action Unit Detection by Learning the Deformation Coefficients of a 3D Morphable Model", Jan. 15, 2021 (Year: 2021).*

Blanz et al., "A Morphable Model For The Synthesis Of 3D Faces", 1999 (Year: 1999).*

Neumann, "Sparse Localized Deformation Components", 2013 (Year: 2013).*

Ma, "Learning to Dress 3D People in Generative Clothing", 2020 (Year: 2020).*

Wang, "3DN: 3D Network Deformations", 2019 (Year: 2019).*

Li et al., "GRASS: Generative Recursive Autoencoders for Shape Structures", 2017 (Year: 2017).*

Hanocka et al.—"MeshCNN: A Network with an Edge", ACM Trans. Graph vol. 1, No. 1, Article Publication Date Feb. 2019 SIGGRAPH.

Mairal et al.—"Sparse Modeling for Image and Vision Processing",Foundations and Trends in Computer Graphics and Vision, vol. 8, No. 2-3(2012), 2014.

Sung et al.—"DeformSyncNet: Deformation Transfer via Synchronized Shape Deformation Spaces" SIGGRAPH Asia, 2020.

Zhu et al.—"AdaCoSeg: Adaptive Shape Co-Segmentation with Group Consistency Loss", Apr. 19, 2020, International Conference on Computer Vision (CVPR).

Wang et al.—"3DN:3D Deformation Network", Conference on Computer Vision and Pattern Recognition (CVPR), Mar. 8, 2019.

Salimans et al.—"Improved Techniques for Training GANs", 30th Conference on Neural Information Processing Systems (NIPS 2016).

Qi et al.—"PointNet: Deep Learning on Point Sets for 3D Classification and Segmentation", Apr. 10, 2017, Conference on Computer Vision and Pattern Recognition (CVPR).

Mo et al.—"StructureNet: Hierarchical Graph Networks for 3D Shape Generation", Aug. 1, 2019, SIGGRAPH Asia.

Mehr et al.—"DiscoNet: Shapes Learning on Disconnection Manifolds for 3D Editing", CCV 2019.

Li et al.—"GRASS: Generative Recursive Autoencoders for Shape Structures", ACM Transactions on Graphics, vol. 36, No. 4, Article 52, Publication Date: Jul. 2017 SIGGRAPH.

Jack et al.—"Learning Free-Form Deformations for 3D Object Reconstruction", Mar. 29, 2018, Asian Conference on Computer Vision (ACCV).

Groueix et al.—"AtlasNet" A Papier-Mache' Approach to Learning 3D Surface Generation, Feb. 15, 2018, Conference on Computer Vision and Pattern Recognition (CVPR).

Goodfellow et al.—"Generative Adversarial Nets", Jun. 10, 2014, NeurIPS.

Blanz et al.—"A Morphable Model for the Synthesis of 3D Faces", SIGGRAPH, 1999.

Achlioptas et al.—"Learning Representations and Generative Models for 3D Point Clouds", Proceedings of the 35th International Conference on Machine Learning, Stockholm, Sweden, 2018.

Aumentado-Armstrong et al.—"Geometric Disentanglement for Generative Latent Shape Models", 2019 IEEE/CVF International Conference on Computer Vision (ICCV), IEEE, Oct. 27, 2019.

Wang et al.—"3D-PhysNet: Learning the Intuitive Physics of Non-Rigid Object Deformations", Proceedings of the Twenty-Seventh International Joint Conference on Artificial Intelligence (IJCAI-18), Jul. 13, 2018.

Liu et al.—"Interactive 3D Modeling with a Generative Adversarial Network", Arxiv.Org, Cornell University Library, Olin Library Cornell University Ithaca. NY 14853, arXiv:1706.05170v1 [cs.CV] , Jun. 16, 2017.

Chen et al.—"Deep Generative Model for Efficient 3D Airfoil Parameterization and Generation", Arxiv.Org, Cornell University Library, Olin Library Cornell University Ithaca, NY 14853, arXivr2101.02744v1 [cs.LG], Jan. 7, 2021.

International Search Report dated Aug. 11, 2021 issued in corresponding EP patent application No. 21305132.9.

Office Action dated Nov. 11, 2025, issued in counterpart JP Application No. 2021-209547, with English Translation. (6 pages).

* cited by examiner

ADVERSARIAL 3D DEFORMATIONS LEARNING

CROSS REFERENCE TO RELATED APPLICATIONS

This application claims priority under 35 U.S.C. § 119 or 365 to European Application No. 21305132.9, filed Jan. 29, 2021. The entire contents of the above application are incorporated herein by reference.

FIELD

The disclosure relates to the field of computer programs and systems, and more specifically to a method, system and program of machine-learning, for learning 3D deformations.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systemes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Within this context and other contexts, deforming 3D modeled objects is gaining wide importance.

However, there is still a need for an improved solution 3D modeled object deformation.

SUMMARY

It is therefore provided a computer-implemented method of machine-learning. The method comprises providing a dataset of 3D modeled objects representing real-world objects. The method further comprises learning, based on the dataset, a generative neural network. The generative neural network is configured for generating a deformation basis of an input 3D modeled object. The learning comprises an adversarial training.

The method may comprise one or more of the following:
the method further comprises training, by minimizing a discriminative loss, a discriminative neural network configured for determining whether or not a 3D modeled object resulting from the application of a linear combination of a deformation basis generated by the generative neural network is realistic or synthetic;
the learning of the generative neural network comprises training the generative neural network to fool the discriminative neural network;
the learning of the generative neural network comprises minimizing a generative loss, the method alternating minimizations of the generative loss and minimizations of the discriminative loss;
the minimization of the discriminative loss is based on random linear combinations of deformation basis generated by the generative neural network;
the learning is carried out mini-batch by mini-batch, and for each mini-batch, the learning comprises, for each 3D modeled object of the mini-batch, generating a random linear combination of the deformation basis of the 3D modeled object generated by the generative neural network, by randomly sampling coefficients of the linear combination;
the random sampling comprises a random sampling of a number of non-zero coefficients and/or, for each non-zero coefficient, a random sampling of the coefficient value according to a pseudo-bounded probability distribution;
the generative loss comprises a term rewarding fooling of the discriminative neural network by a linear combination of the deformation basis generated by the generative neural network;
the generative loss further comprises a term rewarding a disparity between an input 3D modeled object and a linear deformation of the input 3D modeled object spanned by the deformation basis generated by the generative neural network;
the generative loss further comprises a term rewarding sparsity of the deformation basis generated by the generative neural network; and/or
the generative loss is of the type:

$$E_2 = \sum_{i=1}^{N} \log(1 - d(y_i)) - \frac{\lambda}{m} D_{CH}(x_i, y_i) + \frac{\delta}{mn} \sum_{j=1}^{n} \left\| \begin{pmatrix} \|g_w(h, x_{i,1})_j\|_2 \\ \vdots \\ \|g_w(h, x_{i,m})_j\|_2 \end{pmatrix} \right\|_1 ,$$

where:
d is the discriminative neural network;
$x_1, \ldots, x_N$ are 3D modeled objects forming a mini-batch of the dataset, N being a number of objects in the mini-batch;

$$\begin{pmatrix} g_w(h, x_{i,1})_j \\ \vdots \\ g_w(h, x_{i,m})_j \end{pmatrix}, 1 \le j \le n,$$

is the deformation basis generated by the generative neural network at object $x_i$, n being a number of vectors of the deformation basis, $x_{i,1} \ldots x_{i,m}$ being the points or vertices of $x_i$;
m is a number of points or vertices of each 3D modeled object of the mini-batch;
$y_i$ is the linear deformation of $x_i$ spanned by the deformation basis generated by the generative neural network at object $x_i$;
$D_{CH}$ is the Chamfer distance; and
$\lambda$ and $\delta$ are parameters of the generative loss.

It is further provided a generative neural network learnable according to the method, e.g. a generative neural network having been learnt by the method. The generative neural network forms a computer-implemented data structure having layers of neurons with weights (also referred to as parameters) of which values are settable (e.g. have been set) by the learning according to the method.

It is further provided a computer-implemented method of use of the generative neural network.

It is further provided a computer program comprising instructions for performing the method and/or the method of use.

It is further provided a device comprising a data storage medium having recorded thereon the computer program and/or the neural network.

The device may form or serve as a non-transitory computer-readable medium, for example on a SaaS (Software as a service) or other server, or a cloud based platform, or the like. The device may alternatively comprise a processor coupled to the data storage medium. The device may thus form a computer system in whole or in part (e.g. the device is a subsystem of the overall system). The system may further comprise a graphical user interface coupled to the processor.

BRIEF DESCRIPTION OF THE DRAWINGS

Embodiments will now be described, by way of non-limiting example, and in reference to the accompanying drawings, where.

DETAILED DESCRIPTION

Figure 1:
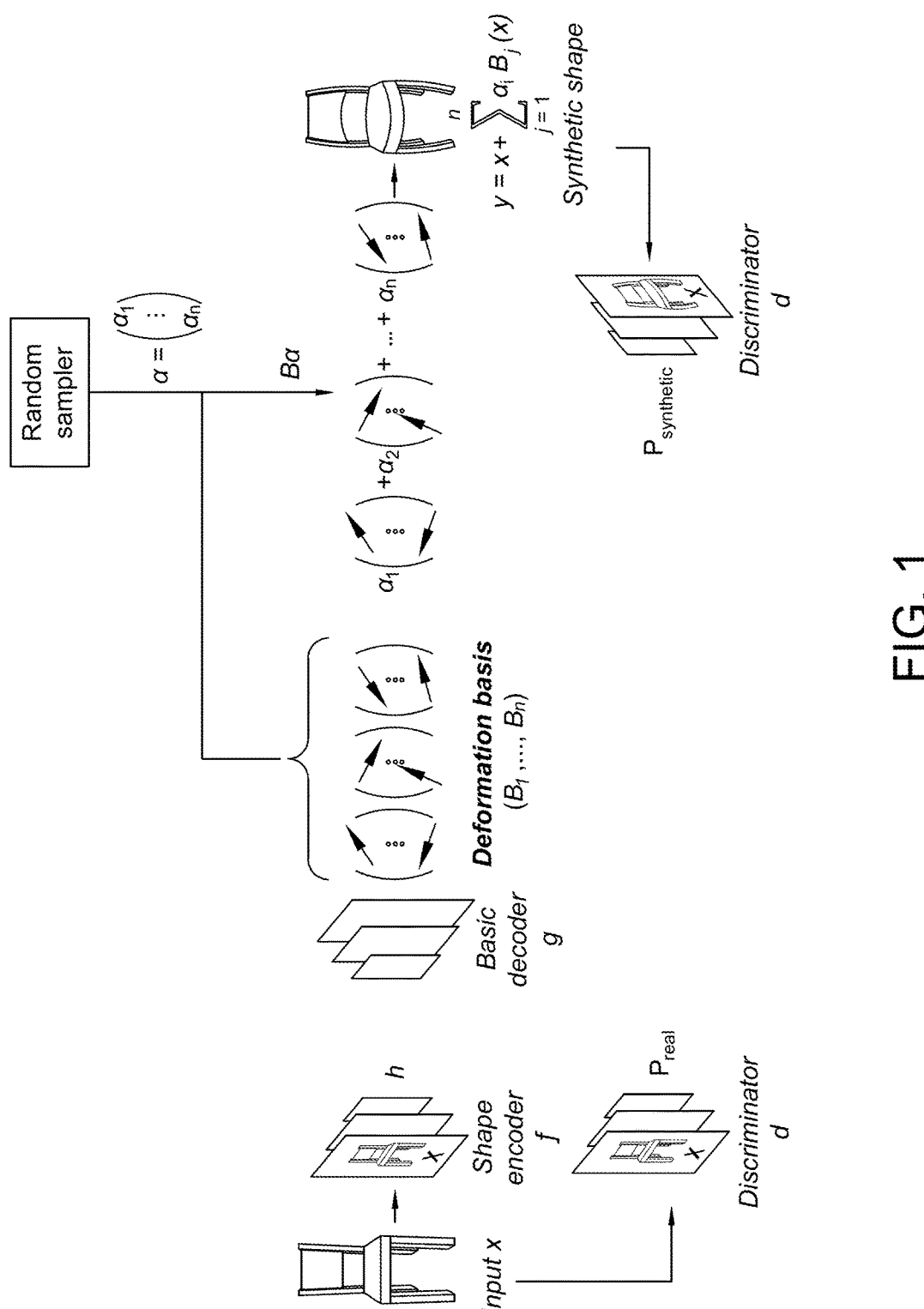
FIGS. 1, 2, 3, 4, 5, 6, 7, 8, 9, 10, 11, 12, and 13 illustrate the method.

It is proposed a computer-implemented method of machine-learning. The method comprises providing a dataset of 3D modeled objects representing real-world objects. The method further comprises learning, based on the dataset, a generative neural network. The generative neural network is configured for generating a deformation basis of an input 3D modeled object. The learning comprises an adversarial training. The method may be referred to as "the learning method". The learning method constitutes an improved solution for 3D modeled object deformation.

Notably, the learning method learns a generative network capable to generate a deformation basis of an input 3D modeled object, i.e. a basis of deformation vectors each forming a direction of deformation of the input 3D modeled object. The basis may thus be used to deform a 3D modeled object, for example according to a method of use of the generative neural network, as discussed hereinafter. Furthermore, the generative neural network is learnt based on a dataset of 3D modeled objects representing real-world objects, such that the generative neural network learns to generate basis of deformations of 3D representations of real-world objects, and the basis can thus be used to obtain realistic deformations of 3D real-world objects. In other words learning method thus provides a solution to obtain realistic 3D deformations for any 3D modeled object.

The generative neural network is trained with an adversarial training. During the learning of the generative neural network, the generative neural network takes as input 3D modeled objects of the dataset and outputs several deformation basis of these objects, each output forming an attempt of the generative neural network to yield a basis providing realistic deformations of the input 3D modeled object. When an output does not enable realistic deformations, the training of the generative neural network carries on, i.e. the weights of the neural network keep on being modified. The training carries on until the generative neural network eventually yields, from a given input 3D modeled object, a deformation basis which, when linearly combined and then applied to the input, form a realistic 3D modeled object, i.e. a realistic deformation of the input. The training is adversarial: the generative neural network is trained to provide outputs enabling realistic deformations, but meanwhile, the evaluation of the realism of the 3D modeled objects resulting from these deformations during the training increases in requirement/exigency as the generative neural network improves itself. In other words, the adversarial training trains the generative neural network to consistently improve itself in providing deformation basis yielding realistic deformations while persistently increasing the requirement/exigency of the evaluation of the level of realism of the 3D modeled objects resulting from these deformations. Ultimately, this adversarial training thereby ensures realism of the deformation basis generated by the generative neural network.

The adversarial training carried out by the method also improves variability of the deformations that can be obtained using the basis generated by the generative neural network. Indeed, the training of the neural network is not supervised, nor constrained by any labelling, object category or target deformation to achieve. So when taking as input 3D objects of the dataset, the generative neural network, when attempting to generate as output deformation basis, explores a wide possibility of deformation basis of the input objects, being not limited to target deformations nor restricted by object categories. But as the generative neural network is trained with an adversarial training, although the generative neural network explores a wide possibility of deformation basis, in the end, the generative neural network is constrained to output deformation basis allowing to deform the input objects into realistic 3D modeled objects, as the adversarial training increases the level of exigency/requirement for assessing/evaluating realism while training the generative neural network to improve the realism of its output. In other words, although the generative neural network may explore a large variability of deformation basis, the adversarial training enables to retain those which are realist. In other words, the adversarial training contributes to obtain a generative neural network which is robust, while having an improved variability, and being agnostic to object category or type.

Furthermore, the learning is unsupervised, in particular does not involve any supervision of the structure. The generative neural network can thereby be learnt so as to generate deformation basis comprising vectors each being a deformation localized on a part of the input 3D modeled object. Thereby, the generative neural network implicitly learns to bring out the structure of its input 3D modeled object, which makes the neural network particularly adapted for being used for segmentation of 3D objects or for 3D structure discovery.

The deformation basis generated by the generative neural network may be used in many applications as discussed hereinafter, such as shape synthesis, shape reconstruction from image, shape matching, (e.g. automatic) segmentation, 3D editing/intelligent 3D design tools and 3D structure discovery.

The learning method is for machine learning.

As known per se from the field of machine-learning, the processing of an input by a neural network includes applying operations to the input, the operations being defined by data including weight values. Learning a neural network thus includes determining values of the weights based on a dataset configured for such learning, such a dataset being possibly referred to as a learning dataset or a training dataset. For that, the dataset includes data pieces each forming a respective training sample. The training samples represent the diversity of the situations where the neural network is to be used after being learnt. Any training dataset herein may comprise a number of training samples higher than 1000, 10000, 100000, or 1000000. In the context of the present disclosure, by "learning a neural network based on a dataset", it is meant that the dataset is a learning/training dataset of the neural network, based on which the values of the weights (also referred to as "parameters") are set.

In the context of the learning method, the training dataset is the provided dataset of 3D modeled objects, which is now discussed. Prior to the discussion on the providing of the dataset, data structures involved therein are now discussed.

The training dataset is a dataset of 3D modeled objects, i.e. consisting in 3D modeled objects. The learning method thus generally manipulates modeled objects. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

Any 3D modeled object herein may representing a product such as a part or an assembly of parts, or possibly an assembly of products. By "3D modeled object", it is meant any object which is modeled by data allowing its 3D representation. A 3D representation allows the viewing of the part from all viewpoints (e.g. from various angles and/or distances). For example, a 3D modeled object, when 3D represented, may be handled and turned around any of its axes, or around any axis in the screen on which the representation is displayed. This notably excludes 2D icons, which are not 3D modeled. The 3D modeled object may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

Any 3D modeled object herein may form a discrete geometrical representation of a 3D real-world object, e.g. representing an object from the real world such as a mechanical part as previously discussed. The discrete geometrical representation is herein a data structure which comprises a discrete set of pieces of data. Each piece of data represents a respective geometrical entity positioned in a 3D space. Each geometrical entity represents a respective location of the 3D object (in other words, a respective portion of material constitutive of a solid represented by the 3D object). The aggregation (i.e. union or juxtaposition) of the geometrical entities represents altogether the 3D object. Any discrete geometrical representation herein may in examples comprise a number of such pieces of data higher than 100, 1000, or 10000.

Any discrete geometrical representation herein may for example be a 3D point cloud, each geometrical entity being a point. Any discrete geometrical representation herein may alternatively be a 3D mesh, each geometrical entity being a mesh tile or face. Any 3D mesh herein may be regular or irregular (i.e. consisting or not of faces of a same type). Any 3D mesh herein may be a polygonal mesh, for example a triangular mesh. Any 3D mesh herein may alternatively be a B-Rep. Any 3D mesh herein may be obtained from a 3D point cloud, for example by triangulating the 3D point cloud (e.g. with a Delaunay triangulation). Any 3D point cloud herein may be determined from physical measurements on a real object, for example within a 3D reconstruction process. The 3D reconstruction process may comprise providing the real object, providing one or more physical sensors each configured for acquiring a respective physical signal, and acquiring one or more respective physical signals by operating the one or more physical sensors on the real object (i.e. scanning the real object with each sensor). The 3D reconstruction may then automatically determine a 3D point cloud and/or a 3D mesh based on the measurements, according to any known technique. The one or more sensors may comprise a plurality of (e.g. RGB, and/or image or video) cameras and the determination may comprise a structure-from-motion analysis. The one or more sensors may alternatively or additionally comprise one or more depth sensors (e.g. on an RGB-depth camera) and the determination may comprise a 3D reconstruction from depth data. The one or more depth sensors may for example comprise a laser (e.g. a lidar) or an ultrasound emitter-receiver.

Any 3D point cloud or 3D mesh herein may alternatively be obtained from a 3D modeled object representing a skin (i.e. outer surface) of a solid (e.g. corresponding to B-Rep model, which represents a skin, i.e. an exact surface), for example by ray-casting on the 3D modeled object or tessellating the 3D modeled object. The tessellating may be performed according to any 3D modeled object rendering process. Such a rendering process may be coded on any CAD system in order to display a graphical representation of the 3D modeled object. The 3D modeled object may be designed or have been designed by a user with a CAD system.

The providing of the dataset may comprise forming the dataset, e.g. by creating the 3D modeled objects. Creating the 3D modeled objects may for example comprise acquiring the 3D modeled objects with a 3D reconstruction process, as discussed hereinabove. Alternatively, the providing of the dataset may comprise retrieving the dataset from a (e.g. distant) memory where it has been stored subsequent to its creation. The 3D modeled objects of the training dataset may for example all or partly be retrieved from the known ShapenetCore.V2 dataset. The 3D modeled objects of the dataset may all be 3D point clouds, e.g. resulting from a pre-processing of 3D meshes. Alternatively, they may all be 3D meshes. In such a case, the learning method may comprise a pre-processing of these meshes which samples them into 3D point clouds. The pre-processing may comprise centering each 3D mesh. The pre-processing may then comprise rescaling independently each 3D mesh's dimensions such that the mesh vertices exactly fits in a unit sphere. The pre-processing may then comprise extracting a dense point cloud from each normalized shape in the dataset, e.g. by raycasting each one on 6 orthographic views. The pre-processing may then comprise uniformly sub-sampling each point cloud (e.g. by downsampling each point cloud to the same size). The sub-sampling may start by a random point of the point cloud and iteratively pick the furthest point of the point cloud from the already selected points, reaching the desired number of points. Alternatively, the 3D meshes may directly form the 3D modeled objects of the dataset, i.e. without any pre-processing. The 3D modeled objects of the dataset may all have a same number of points, a point being for example a vertex in case of a mesh, or a point sampled from the mesh surface in case of a mesh, or a point of a point cloud in case of a point cloud. Alternatively, the number of points may vary from one object of the dataset to another.

The 3D modeled objects of the training dataset represent real-world objects, i.e. each 3D modeled object of the training dataset represents an object of the real-world, such as a vehicle (e.g. a plane), a furniture (e.g. a couch or a chair) or a mechanical part. The 3D modeled objects of the training dataset may belong to different categories of objects: for example, the 3D modeled objects of the training dataset may comprise two or more of furniture, mechanical parts and vehicles.

The learning of the generative neural network is now discussed.

The generative neural network is configured for generating a deformation basis of an input 3D modeled object. In other words, the generative neural network takes as input a 3D modeled object and outputs a deformation basis of the 3D modeled object. The deformation basis is generated: the generative neural network does not attempt to infer a deformation meeting a target object or meeting a user constraint, but generates, i.e. creates, a deformation basis of the input object. For that, the input 3D modeled object is of the same data type than the 3D modeled objects of the training dataset. For example, if the 3D modeled objects of the dataset are 3D meshes, the input 3D modeled object is also a 3D mesh. Alternatively, if the 3D modeled objects of the dataset are 3D point clouds, the input 3D modeled object is also a 3D point cloud. The 3D modeled object may nonetheless be a 3D point cloud that results from a sampling of a mesh.

The deformation basis is a set of vectors each being a direction of deformation of the input 3D modeled object. In other words, the generative neural network learns to generate, for an input object, a set of vectors each being a direction of deformation of the input object. The vectors form a basis, i.e. they can be linearly combined to deform the input 3D modeled object, the linear combination with its coefficients (also referred to as amplitudes) having their values set forming a linear deformation of the input 3D modeled object. In other words, when applied to the input 3D modeled object, a linear combination of the deformation basis vectors is another 3D modeled object which is a deformation of the input 3D modeled object. The vectors may be linearly combined in such a way that if the linear combination is small enough (i.e. the coefficients/amplitudes do not have a too large value), the deformed input 3D modeled object is close to the input 3D modeled object. In such a case the deformation thereof is realist. Mathematically, the deformation is realistic as long as the manifold thereof stays sufficiently close to the deformation, which is on the tangent space, the latter being defined by the deformation basis. The deformation basis may be a basis in the meaning of linear algebra, that is a set of linearly independent (e.g. orthogonal) vectors, the basis being possibly normalized, e.g. orthonormal. Specifically, the learning aims for the generative neural network to infer, or at least to tend to infer, a basis of deformation vectors which are linearly independent (e.g. uncorrelated and/or orthonormal, as further discussed hereinafter). The deformation basis may have a fixed size (e.g. between 2 and 10 vectors, or more than 10 vectors). In other words, the generative neural network may always (i.e. for each input 3D modeled object) output a deformation basis having a same fixed number of vectors. The training dataset being made of 3D modeled objects representing real-world objects, the generative neural network infers a basis of deformation vectors of an input 3D modeled object which represent each a realistic deformation direction of the input, because it is trained to do so. Thereby, any small linear combination of the vectors forms a realistic representation (i.e. a 3D modeled object) of a deformation of the input.

Generating a deformation basis of a 3D modeled object differs from generating a deformation of the 3D modeled object in that the deformation basis is made of several vectors each representing a deformation direction of the modeled object, such that the vectors can be linearly combined, each linear combination forming a respective deformation of the 3D modeled object. Generating a deformation would correspond to generating directly the result of only one of such combinations. In other words, the learnt generative neural network does not just infer one deformation for each input, but instead provides a basis of deformation vectors which can be linearly combined at will to generate various deformations, without further computations than linearly combining the vectors.

The generative neural network has an architecture configured for taking as input a 3D modeled object and for outputting its deformation basis, i.e. the generative neural network has an architecture which is any architecture adapted for doing so. The generative neural network may be a deep neural network. For example, the neural network may comprise an encoder and a deep feedforward neural network. The encoder is configured to take as input a 3D modeled object and to output a latent vector representing the input 3D modeled object. The encoder may thus be configured to take as input a 3D mesh or a 3D point cloud, e.g. sampled from a 3D mesh. The deep feedforward neural network is configured to take as input a latent vector outputted by the encoder and to output a deformation basis of a 3D modeled object represented by the latent vector. The encoder architecture may be based on PointNet (as described for example in C. Qi, H. Su, K. Mo, L. Guibas. "*Pointnet: Deep learning on point sets for 3d classification and segmentation*", in Conference on Computer Vision and Pattern Recognition (CVPR), 2017, which is incorporated herein by reference) or any extension thereof. Alternatively, the encoder architecture may use mesh topology (i.e. if the 3D modeled objects of the dataset are 3D meshes), for example as done in MeshCNN (as described for example in R. Hanocka, A. Hertz, N. Fish, R. Giryes, S. Fleishman, D. Cohen-Or, "*Meshcnn: A network with an edge*", In SIGGRAPH, 2019, which is incorporated herein by reference). The generative neural network may also be referred to as "the generator".

The learning of the generative neural network comprises an adversarial training.

The adversarial training is a training method, e.g. implemented by an adversarial training algorithm executed by learning method, that evaluates the realism of the output of the generative neural network with increasing exigency/requirement. Specifically, the generative neural network takes as input successive 3D modeled objects of the training dataset, and for each input, generates a deformation basis having a certain level of realism, i.e. which, when linearly combined and applied to the input object, forms a 3D modeled object having a certain level of realism. Now, the adversarial training evaluates, with increasing exigency, the quality of the realism of the generated deformation basis, and if the quality is not satisfying, i.e. the generated basis is not realistic enough, then the training of the generative neural network carries on, i.e. the weights of the generative neural network are modified so that the next deformation basis generated by the generative neural network be more realist. In other words, the adversarial training may comprise iterations of:

selecting a 3D modeled object of the training dataset;
generating, by the generative neural network, a deformation basis of the 3D modeled object;
evaluating the realism of the generated deformation basis, i.e. evaluating whether the generated deformation basis, when linearly combined and applied to the 3D modeled object, forms a realistic 3D modeled object; and
modifying the weights of the generative neural network to improve realism of the basis it generates,
the exigency of each evaluating increasing along the iterations. The exigency/requirement increases in that the adversarial training, along the learning, increases the exigency with which evaluation of the realism of an output of the generative neural network is made. In other words, along the learning, the generative neural network is more and more robust for outputting realistic outputs (i.e. deformation basis that forms realistic 3D modeled object when linearly combined and applied to the inputs), but the realism requirements that the outputs must satisfy increase in exigency, which in turn makes the generative neural network more and more robust, and so on.

Now, the generative neural network does not rely on a labelling of the 3D objects of the dataset, or on a target deformation or a (e.g. user) constraint to generate a basis, or on a category of the input objects. In other words, the generative neural network does not attempt to infer a basis meeting a target deformation, or respecting a (e.g. user-provided) deformation constraint, or a labelling, or remaining in a defined category of objects. In yet other words, the generative neural network, when generating a deformation basis of an input object, makes an attempt to find a set of deformation directions of the object, i.e. explores a space of deformation directions of the object. This allows the generative neural network not to be limited when generating the basis: the generative neural network is free to explore deformation directions, so it explores a large variability of possible deformation basis. So variability is improved. Yet, the deformations are nonetheless realist, as the generative neural network is trained with the adversarial training, which ensures, with increasing exigency, that, should the neural network attempt to output a non-realistic (i.e. synthetic) deformation basis, the non-realistic output is identified as such and discarded, i.e. the training proceeds to modify the weights of the generative neural network to tend to avoid to output such non-realistic basis. In other words, the generative neural network is able to generated a great variability of deformation basis, without being limited by labels, without requiring a target deformation or a (e.g. user-provided) deformation constraint, without dependence on object category (i.e. the neural network is agnostic to the category of the input), but the deformation basis are realist, because of the adversarial training. In yet other words, the adversarial training allows the learning to be unsupervised yet robust, which makes the generative neural network robust while agnostic to object category or label.

The method may comprise training a discriminative neural network, i.e. as a part of the adversarial training, by minimizing a discriminative loss. The discriminative neural network may also be referred to as "the discriminator". The discriminative neural network and the generative neural network may altogether form a deep neural network. The discriminative neural network and the generative neural network are learnt together by the adversarial training. The discriminative neural network is configured for determining whether or not a 3D modeled object resulting from the application of a linear combination of a deformation basis generated by the generative neural network to an input 3D modeled object (i.e. the input for which the deformation basis is generated) is realistic or synthetic. In other words, the discriminative neural network evaluates the realism of the 3D modeled object resulting from the application, to the input 3D modeled object, of the linear combination of the generated deformation basis. The discriminative neural network may for example be trained to discriminate (e.g. distinguish) between an input 3D modeled object representing a real-world object (i.e. a 3D modeled object of the training dataset, which is realist), and a 3D modeled object which is a deformation resulting from the application of a linear combination of the generated deformation basis for the input (i.e. which is synthetic but can be seen as realist provided that the generative neural network is trained enough). Thereby, only when a generated basis, when linearly combined and applied to an input 3D modeled object, truly yields a realistic 3D modeled object can the discriminative neural network determine this 3D modeled object as realistic despite this object resulting from a deformation. By linear combination of the deformation basis, it is meant "linear combination of vectors of the deformation basis".

The training of the discriminative neural network is part of the adversarial training: the discriminative neural network is a neural network trained to evaluate the realism of a 3D modeled object resulting from the application of a linear combination of the output of the generative neural network to an input 3D modeled object. In other words, the discriminative neural network takes as input a 3D modeled object resulting from the application, to the input 3D modeled object of the generative neural network, of a linear combination of vectors of a deformation basis outputted (i.e. generated) by the generative neural network for the input 3D modeled object, i.e. during the training of the generative neural network, and determines whether this 3D object resulting from the linear combination, that corresponds to a deformation (i.e. it is a linear deformation of the input spanned by the generated basis), is a realistic object or not, i.e. classifies the linear combination as realistic or synthetic. The discriminative neural network may for example output a probability for the linear combination to be realistic or synthetic, i.e. a value comprised between 0 and 1, e.g. 1 indicating a realistic object and 0 a synthetic object.

The training of the discriminative neural network may comprise training the discriminative neural network to determine that 3D modeled objects resulting from the application of linear combinations of basis generated by the generative neural network are, as such, synthetic. In other words, the purpose of the training of the discriminative neural network may be that the discriminative neural network should consistently determine a 3D modeled object which is a linear deformation spanned by an output of the generative neural network as synthetic. The training of the discriminative neural network may further comprise training the discriminative neural network to determine that the 3D modeled objects of the training dataset are realist. For example, the discriminative neural network may be trained to discriminate between an input 3D modeled object of the dataset, to be classified as realist, and a 3D modeled object which is a deformation of the input 3D modeled object, i.e. which results from the application of a linear combination of vectors of a deformation basis generated by the generative neural network for the input 3D modeled object, to be classified as synthetic. This allows to train a robust discriminative neural network since the discriminative neural network is trained to classify a deformation yielded by a generated basis as being as such synthetic, so that only when such a 3D modeled object resulting from a deformation is or tends to be truly realistic (as a 3D object of the training dataset) will the discriminative neural network tend to classify it as realist. Moreover, as the generative neural network provides deformation basis which yield increasingly realistic deformation-resulting 3D modeled objects, the discriminative neural network becomes increasingly exigent when determining realism of such a 3D modeled object resulting from a deformation, which in turns, causes the generative neural network to further improves its realism. The training of the discriminative neural network may for example comprise iterations of:

selecting a linear combination of a deformation basis generated by the generative neural network for an input 3D modeled object; and
  modifying the weights of the discriminative neural network if the discriminative neural network determines or tends to determine the 3D modeled object resulting from the application of the linear combination to the input 3D modeled object as realist and/or if the discriminative neural network determines or tends to determine the input 3D modeled object as synthetic.

The training of the discriminative neural network is by minimizing a discriminative loss. The discriminative loss may be any loss that rewards a low probability of a 3D modeled object resulting from the application of a linear combination of a generated deformation basis to the input 3D modeled object to be realist. In other words, the loss depends on the probability of the 3D modeled object resulting from the linear combination of the deformation basis to be realist, and the lower this probability is, the lower the value of the loss is. In other words, a large value of the loss indicates a high probability of a 3D modeled object resulting from a linear combination of a generated deformation basis to the input 3D modeled object to be realist. Since the training minimizes the loss, the weights of the discriminative neural network are then modified with the purpose of reducing the value of the loss. This allows ultimately to train the discriminative neural network to be conditioned to classify 3D modeled objects resulting from linear combinations of generated basis as synthetic, which improves robustness of the discriminative neural network, and thereby that of the generative neural network as previously explained. The discriminative loss may further reward a high probability of the input 3D modeled object to be realist. In other words, the loss may further depend on the probability of the input 3D modeled object to be realist, the loss having a large value when this probability is low. Since the training minimizes the loss, the weights of the discriminative neural network are then modified with the purpose of reducing the value of the loss. The training of the discriminative neural network may comprise iterations of:

selecting a linear combination of a deformation basis generated by the generative neural network for an input 3D modeled object;
  assessing a value of the discriminative loss for a 3D modeled object resulting from the application of the linear combination to the input 3D modeled object and for the input 3D modeled object;
  modifying the weights of the discriminative neural network if the value of the loss is too high.
  In examples, the discriminative loss is of the type:

$$E_1 = \sum_{i=1}^{N} -\log(d(x_i)) - \log(1 - d(y_i)),$$

where N is a number of input 3D modeled objects (e.g. the number of 3D modeled objects of a mini-batch if the learning is carried out mini-batch by mini-batch), d is the discriminative neural network, $x_i$ is an input 3D modeled object (i.e. a 3D modeled object of the training dataset), and $y_i$ is a 3D modeled object resulting from the application, to the input $x_i$, of a linear combination of the deformation basis generated by the generative neural network for the input $x_i$.
  In other examples, the discriminative loss is of the type:

$$E_1 = \sum_{i=1}^{N} [d(x_i) - 1]^2 + [d(y_i)]^2.$$

The discriminative neural network is trained during the learning, i.e. the learning trains the discriminative neural network to determine whether or not a 3D modeled object resulting from the application of a linear combination of the deformation basis generated by the generative neural network is realistic or synthetic while the generative neural network is trained, its training relying on the determinations made by the discriminative neural network. In other words, the adversarial training trains the generative neural network to generate basis based on which realistic deformation-resulting 3D modeled objects can be obtained, the realism being evaluated during the adversarial training by the determinations of realism made by the discriminative neural network, while training the discriminative neural network to make such evaluations. For example, the adversarial training may comprise iterations of:

one or more iterations of:
    selecting an input 3D modeled object of the training dataset;
    generating, by the generative neural network, a deformation basis of the input 3D modeled object;
    evaluating the realism of the generated deformation basis by applying the discriminative neural network to a 3D modeled object resulting from the application of a linear combination of the basis to the input 3D modeled object; and
    modifying the weights of the generative neural network if the deformation basis tends to be evaluated as synthetic; and
  one or more iterations of:
    selecting a linear combination of a deformation basis generated by the generative neural network;
    modifying the weights of the discriminative neural network if the discriminative neural network determines or tends to determine the 3D modeled object resulting from the application of the linear combination as realist and/or if the discriminative neural network determines the input 3D modeled object as synthetic.

It is to be understood that, when the weights of the discriminative neural network are modified, the weights of the generative neural network are fixed, and, conversely, when the weights of the generative neural network are modified, the weights of the discriminative neural network are fixed.

The learning of the generative neural network may comprise training the generative neural network to fool (i.e. deceive) the discriminative neural network. As previously discussed, the generative neural network is trained to output a realistic deformation basis, i.e. so that a 3D modeled object resulting from the application of a linear combination of the basis vectors to the input tend to be realist, while the discriminative neural network is trained to determine that this deformation-resulting object is synthetic. By "fool", it is meant that the training of the generative neural network to output realistic basis is carried out by constraining the generative neural network to output deformation basis which, when linearly combined and applied to the input, should form a 3D modeled object tending to be determined as realistic by the discriminative neural network. In other words, the discriminative neural network is trained to systematically correct the generative neural network, i.e. to systematically classify a 3D modeled object which is a linear deformation of the input of the generative neural network as synthetic, while the generative neural network is trained to avoid the discriminative neural network correcting it, i.e. to avoid the discriminative neural network determining the deformations yielding by its outputs as synthetic. In yet other words, the generative neural network is trained to output a basis which, when linearly combined and applied to the input 3D modeled object, forms a deformation-resulting 3D modeled object, which is a deformation of the input, to be seen as realist by the discriminative neural network, while the discriminative neural network is trained not to see this deformation-resulting object as realist. This improves robustness of the generative neural network, which is trained to deceive a discriminator which is more and more robust and unlikely to be deceived progressively along the adversarial training. The adversarial training may in other words train the generator to fool the discriminator while training the discriminator to be more and more vigilant to the fooling attempts of the generator.

The learning of the generative neural network may comprise minimizing a generative loss, the method alternating minimizations of the generative loss and minimizations of the discriminative loss. The generative loss is any loss that rewards realism of a 3D modeled object resulting from the application of a linear combination of a basis generated by the generative neural network to the input 3D modeled object. In other words, the generative loss depends on the realism of this deformation-resulting 3D modeled object (i.e. the this deformation-resulting 3D modeled object is a variable of the loss) and has a high value when the realism tends to be low, i.e. the this deformation-resulting 3D modeled object tends to be synthetic. The generative loss may for example depend on the value of the discriminative neural network on this deformation-resulting 3D modeled object fed as input to the loss. The method alternates the minimizations of the generative loss and of the discriminative loss. In other words, the minimizations of the generative loss trains the generative neural network (i.e. results in a modification of its weights) while the minimizations of the discriminative loss trains the discriminative neural network (i.e. results in a modification of its weights), and the method alternates them: the learning comprises iterations of one or more iterations of the minimization of the generative loss and of one or more iterations of the minimization of the discriminative loss. The learning may for example comprise iterations of:

one or more iterations of:
    selecting an input 3D modeled object of the training dataset;
    generating, by the generative neural network, a deformation basis of the input 3D modeled object;
    evaluating the realism of the generated deformation basis by applying the discriminative neural network to a 3D modeled object resulting from the application of a linear combination of the basis to the input 3D modeled object and by evaluating the value of the generative loss for the 3D modeled object resulting from the application of the linear combination; and
    modifying the weights of the generative neural network if the value of the generative loss is too large; and
  one or more iterations of:
    selecting a linear combination of a deformation basis generated by the generative neural network;
    modifying the weights of the discriminative neural network if the value of the discriminative loss for the 3D modeled object resulting from the application of the linear combination and for the input 3D modeled object is too large.

The minimization of the discriminative loss may be based on random linear combinations of deformation basis generated by the generative neural network. As previously explained, the discriminative neural network is trained to determine whether a 3D modeled object resulting from the application of a linear combination of a basis generated by the generative neural network to the input 3D modeled object is realistic or synthetic, for example by selecting the combination, applying it to the input, and feeding the resulting 3D modeled object as input to the discriminative loss, and assessing whether the value of the loss is thereby large, in which case the weights of the discriminative neural network are to be modified (i.e. the loss is minimized). The minimization of the discriminative loss is based on random linear combinations in that the selection of the linear combinations is performed randomly, i.e. comprises a random selection (e.g. sampling) of the coefficients of the linear combination. Thereby, the linear combinations of basis generated by the generative neural network based on which the minimization of the discriminative loss is performed are random, such that the discriminative neural network is trained to determine realism based on a significant variety of these combinations. This makes the discriminative neural network more robust.

The minimization of the generative loss may also be based on random linear combinations of deformation basis generated by the generative neural network, i.e. comprises a random selection (e.g. sampling) of the coefficients of the linear combination. Thereby, the linear combinations of basis generated by the generative neural network based on which the generative loss is minimized are random, such that the generative neural network is trained to output basis based on which a significant variety of linear combinations for forming realistic deformations of the input objects can be performed. This makes the generative neural network more robust.

Thus the adversarial training may manipulate random linear combinations of the basis when alternating minimization of the losses. For example, the learning may comprise iterations of:

one or more iterations of:
        selecting an input 3D modeled object of the training dataset;
        generating, by the generative neural network, a deformation basis of the input 3D modeled object;
        randomly selecting a linear combination of the deformation basis by randomly selecting (e.g. sampling) the coefficients of the linear combination;
        evaluating the realism of the generated deformation basis by applying the discriminative neural network to the 3D modeled object resulting from the application of the selected linear combination of the basis to the input 3D modeled object and by evaluating the value of the generative loss for the linear combination; and
        modifying the weights of the generative neural network if the value of the loss is too large; and
    one or more iterations of:
        for each selected linear combination or at least a part of them, modifying the weights of the discriminative neural network if the value of the discriminative loss for the 3D modeled object resulting from the application of the selected linear combination and for the input 3D modeled object is too large.

The learning may be carried out mini-batch by mini-batch. A mini-batch is a subset of the training dataset. As previously explained, learning a neural network comprises feeding as input (up to a pre-processing) successive training samples of the training dataset to the neural network and modifying the weights to correct the outputs of the neural network. Leaning mini-batch by mini-batch means that the learning comprises an iterative selection of subsets (i.e. mini-batches) of training samples, the samples of each subset (i.e. mini-batch) being successively fed as input (up to a pre-processing) to the neural network. The learning method may execute any mini-match learning method, for example any mini-batch stochastic gradient descent method or any other mini-batch stochastic optimization method.

Thereby, the learning according to the learning method iteratively selects mini-baches and for each mini-batch, trains the generative neural network and/or the discriminative neural network with the training samples of the mini-batch. Both networks may be trained on the same mini-batches, or alternatively, on differing mini-batches. It is to be understood that any 3D modeled object of the training dataset may belong to one or more mini-batches. For each 3D modeled object of the mini-batch, the learning comprises feeding as input the 3D modeled object to the generative neural network, which outputs/generates a deformation basis of the input 3D modeled object. Then, the learning comprises generating a random linear combination of the generated deformation basis by randomly sampling the coefficients of the linear combination. In other words, the learning comprises a random sampling of coefficients (e.g. real numbers) that form the respective weights of the vectors of the deformation basis. The learning may comprise forming the linear combination with the randomly sampled coefficients and with the vectors of the generated basis. By "randomly sampling", it is meant a random selection of the coefficients values.

The linear combination, with its randomly sampled coefficients, may then be used for the minimization of the discriminative loss and/or for the minimization of the generative loss, as previously discussed. For example, the learning may comprise iterations of:

selecting a mini-batch in the training dataset;
    one or more first iterations of:
        selecting an input 3D modeled object of the mini-batch;
        generating, by the generative neural network, a deformation basis of the input 3D modeled object;
        randomly selecting a linear combination of the deformation basis by randomly sampling the coefficients of the linear combination;
        evaluating the realism of the generated deformation basis by applying the discriminative neural network to the 3D modeled object resulting from the application of the selected linear combination of the basis to the input 3D modeled object and by evaluating the value of the generative loss for the linear combination; and
        modifying the weights of the generative neural network if the value of the generative loss is too large; and
    one or more second iterations of:
        for each selected linear combination or at least a part of them, modifying the weights of the discriminative neural network if the value of the discriminative loss for 3D modeled object resulting from the application of the selected linear combination and for the input 3D modeled object is too large.

Alternatively, the one or more first iterations may be carried out for more than one mini-batches, and then the one or more second iterations are carried out for the same mini-batches, or (e.g. partially) different ones. In other words, a strict alternance between the minimizations of the generative loss and of the discriminative loss is not required.

The random sampling may comprise a random sampling of a number of non-zero coefficients. In other words, the random sampling may comprise a random selection of the number of non-zero coefficients of the linear combination. This allows to randomly select, during the training of the neural networks, linear combinations which have a small number (e.g. only one) of non-zero coefficients, as well as linear combinations having a larger number, or any number) of non-zero coefficients, these linear combinations being then used to minimize the losses. Notably, selecting linear combinations having a small number (e.g. only one) of non-zero coefficients to be then inputted to the losses allows to minimize the losses based on deformations obtained from a few vectors (e.g. only one) of generated deformation basis. Through the minimizations of the losses, this allows to train the generative neural network to output deformation basis of which vectors form as such (i.e. by themselves) realistic deformations. Thereby, each vector forms a deformation of the input object which is as such realistic and meaningful. Furthermore, the random sampling of the non-zero coefficients improves speed of the learning, as realist deformations are better explored. The random sampling of the number of non-zero coefficients may for example comprise a random sampling of the indices of the non-zero coefficients, e.g. with a Bernoulli distribution on each index.

Additionally or alternatively, the random sampling may comprise, for each non-zero coefficient, a random sampling of the coefficient value according to a pseudo-bounded probability distribution. "Pseudo-bounded" means a probability distribution which has a small tail, for example a probability distribution which is integrable, such as a Gaussian probability distribution or a uniform-law probability distribution. The random sampling of the coefficients values according to the pseudo-bounded probability distribution allows to sample the amplitude of the non-zero coefficients so that they are not too large, because large deformations have a higher chance to be non-realist. In other words, this random sampling, according to a small-tailed probability distribution such as a Gaussian, allows not to explore too large and non-realists deformations when minimizing the losses. This contributes to train the generative neural network so that it outputs a deformation basis which, when linearly combined, form realistic deformations of the input object. This also allows to explore more efficiently the possible deformation basis, by avoiding too large deformations which are unrealistic anyway.

Additionally or alternatively, the random sampling may comprise, for each non-zero coefficient, a random sampling of the sign of the coefficient, for example according to a Bernoulli probability distribution. This allows to obtain coefficients with different signs and increases variability of the sampled linear combinations, which improves robustness of the learning.

When the random sampling comprises a random sampling of a number of non-zero coefficients, and, for each non-zero coefficient, a random sampling of the coefficient value according to a pseudo-bounded probability distribution and a random sampling of the sign of the coefficient, the learning will force the generative neural network to produce deformations which are as such realistic.

The generative loss is now further discussed.

The generative loss may comprise a term rewarding fooling of the discriminative neural network by a linear combination of the deformation basis generated by the generative neural network. The term depends on the discriminative neural network, i.e. the term quantifies the realism of the 3D modeled object resulting from the application of the linear combination by using an evaluation of the realism of the 3D modeled object fed as input to the discriminative neural network. The term is large when the discriminative neural network evaluates the 3D modeled object as synthetic and is small when the discriminative neural network evaluates the 3D modeled object as realistic. In other words, the term has a large value when the generative neural network yields a basis which is such that the 3D modeled object does not fool/deceive the discriminative neural network, i.e. the discriminative neural network detects that the 3D modeled object stems from the application of a linear combination of vectors of a basis generated by the generative neural network and thus determines it as synthetic. Since the generative loss is to be minimized, i.e. the weights of the generative neural network are modified as long as the generative loss has not a sufficiently small value for its inputs, this contributes to training the generative neural network to output realistic deformation basis, i.e. which, when linearly combined, yield realistic deformations, i.e. that fools the discriminative neural network.

The generative loss may further comprise a term rewarding a disparity between an input 3D modeled object and a linear deformation of the input 3D modeled object spanned by the deformation basis generated by the generative neural network. The linear deformation of the input 3D modeled object spanned by the deformation basis generated by the generative neural network is a linear combination, applied to the input 3D modeled object, of the vectors of the deformation basis generated by the generative neural network having taken as input the input 3D modeled object, the coefficients of the linear deformation being for example randomly sampled as previously discussed. The term rewards a disparity in that the term is small when the result of the linear deformation applied to the input 3D modeled object differs from the input 3D modeled object and is large when the result of the linear deformation applied to the input 3D modeled object tends to be close to the input 3D modeled object, the result of the linear deformation and the input being nonetheless always different. Since the generative loss is to be minimized, i.e. the weights of the generative neural network are modified as long as the generative loss has not a sufficiently small value for its inputs, this contributes to training the generative neural network to output deformation basis which, when linearly combined and applied to the inputs, yield deformations which are different from the input object from which the deformation basis has been generated. This prevents any collapsing of the generative neural network, i.e. the generative neural network is prevented from generated deformations which are not deformations (i.e. which are zero-deformations). The term may be any term rewarding a disparity between the input 3D modeled object and the result of the linear deformation, such as the opposite of any distance between the input 3D modeled object and the result of the linear deformation. The distance may for example be the 3D Chamfer distance.

The generative loss may further comprise a term rewarding sparsity of the deformation basis generated by the generative neural network. The term rewarding sparsity is any term that has a low value when the deformation basis is sparse, i.e. when the amplitude of each vector of the deformation basis is sparse. Since the loss is to be minimized, this term forces the generative neural network being trained to output sparse deformation basis, i.e. forces the amplitudes of each vector of the basis to be sparse. Thereby, it enforces the vectors to form deformations localized on parts of the 3D modeled object in a fully unsupervised way, without even knowing the structure of the 3D modeled object. Indeed, a sparse yet plausible deformation cannot involve too many vertices or points of the 3D modeled objects, and a deformation that would move only some but not all points/vertices of a part could not be realistic. The term may for example be a group sparsity term, also referred to as group sparsity loss, such as the one discussed in J. Mairal, F. Bach, J. Ponce, "*Sparse Modeling for Image and Vision Processing*", New Foundations and Trends, 2014, which is incorporated herein by reference.

The generative loss may further comprise an independence term, which is any term preventing the deformation basis to be redundant, i.e. which forces the vectors of the basis to be linearly independent, e.g. by forcing them to be orthogonal. The independence term may for example by an orthogonality loss, or any term enforcing each vector to be orthogonal to the others at each point. Additionally or alternatively, the generative loss may further comprise any other regularization term, such as a Laplacian loss to enforce Laplacian coordinates to be conserved on the deformed shape, as discussed in W. Wang, D. Ceylan, R. Mech, U. Neumann, "*3dn: 3d deformation network*", In Conference on Computer Vision and Pattern Recognition (CVPR), 2019.

The loss may be of the type:

$$E_2 = \sum_{i=1}^{N} \log(1 - d(y_i)) - \frac{\lambda}{m} D_{CH}(x_i, y_i) + \frac{\delta}{mn} \sum_{j=1}^{n} \left\| \begin{pmatrix} \|g_w(h, x_{i,1})_j\|_2 \\ \vdots \\ \|g_w(h, x_{i,m})_j\|_2 \end{pmatrix} \right\|_1,$$

where:

d is the discriminative neural network;

$x_1, \ldots, x_N$ are 3D modeled objects forming a mini-batch of the dataset, N being a number of objects in the mini-batch;

$$\begin{pmatrix} g_w(h, x_{i,1})_j \\ \vdots \\ g_w(h, x_{i,m})_j \end{pmatrix}, 1 \le j \le n,$$

is the deformation basis generated by the generative neural network at object $x_i$, n being a number of vectors of the deformation basis, $x_{i,1} \ldots x_{i,m}$ being the points (in case $x_i$ is a point cloud) or vertices (in case $x_i$ is a mesh) of $x_i$;

m is a number of points or vertices of each 3D modeled object of the mini-batch;

$y_i$ is the linear deformation of $x_i$ spanned by the deformation basis generated by the generative neural network at object $x_i$, i.e. $y_i$ is the 3D modeled object resulting from the application of the linear combination to $x_i$;

$D_{CH}$ is the Chamfer distance; and $\lambda$ and $\delta$ are parameters of the generative loss, e.g. chosen in [0, 1] if the 3D modeled objects in the dataset are normalized, or chosen so that each term of the loss has a similar weight at the beginning of the training.

In case the generative neural network comprises an encoder and a deep feedforward neural network as previously discussed, h is a latent vector encoding $x_i$, $g_w$ is the deep feedforward neural network, and $$h = f_w(x_i),$$

where $f_w$ is the encoder. In this case, $y_i$ is given by the formula:

$$y_i = x_i + \sum_{j=1}^{n} \alpha_j^i g_w(f_w(x_i), x_i)_j,$$

where the $\alpha_j^i$ are the linear coefficients of $y_i$.

The term $$\sum_{i=1}^{N} \log(1 - d(y_i))$$

is the term rewarding fooling of the discriminative neural network by a linear combination ($y_i$) of the deformation basis generated by the generative neural network. This term may be replaced by the term:

$$\sum_{i=1}^{N} (1 - d(y_i))^2.$$

The term $$\sum_{i=1}^{N} -\frac{\lambda}{m} D_{CH}(x_i, y_i)$$

is the term rewarding a disparity between an input 3D modeled object ($x_i$) and a linear deformation ($y_i$) of the input 3D modeled object spanned by the deformation basis generated by the generative neural network. The Chamfer distance $D_{CH}$ is given between two point clouds x and y by the formula $$D_{CH}(x, y) = \sum_{p \in x} \min_{q \in y} \|p - q\|_2^2 + \sum_{q \in y} \min_{p \in x} \|p - q\|_2^2,$$

where p represents the points belonging to x and q the points belonging to y.

The term $$\sum_{i=1}^{N} \frac{\delta}{mn} \sum_{j=1}^{n} \left\| \begin{pmatrix} \|g_w(h, x_{i,1})_j\|_2 \\ \vdots \\ \|g_w(h, x_{i,m})_j\|_2 \end{pmatrix} \right\|$$

is the term rewarding sparsity of the deformation basis generated by the generative neural network.

As previously explained, the loss $E_2$ may further comprise an independence term, i.e. $E_2$ may be of the type:

$$E_2 = \sum_{i=1}^{N} \log(1 - d(y_i)) - \frac{\lambda}{m} D_{CH}(x_i, y_i) +$$

-continued $$\frac{\delta}{mn}\sum_{j=1}^{n}\left\|\begin{pmatrix} \left\|g_w(h,\,x_{i,1})_j\right\|_2 \\ \vdots \\ \left\|g_w(h,\,x_{i,m})_j\right\|_2 \end{pmatrix}\right\|_1 + \gamma \text{ independance term,}$$

where $\gamma$ is a parameter of the generative loss $E_2$. This parameter may have a relatively large value as the independence term will tend to become close to 0 during the learning. Alternatively, this parameter may be chosen in [0, 1] if the 3D modeled objects in the dataset are normalized, or chosen so that each term of the loss has a similar weight at the beginning of the training.

The independence term may in examples be of the type:

$$\left\|g_w(h,x_i)g_w(h,x_i)^T - Id_{n\times n}\right\|_2,$$

or, in other examples, may be of the type:

$$\sum_{i=1}^{N}\sum_{k=1}^{m}\sum_{1\le j<l\le n}\left|g_w(h,\,x_{i,k})_j^T g_w(h,\,x_{i,k})_l\right|.$$

An implementation of the learning method is now discussed.

This implementation provides a new solution to compute a realistic deformations basis for any 3D model. Furthermore, the learned deformations are localized on the parts of the object without any supervision (in particular without supervision of the structure), and therefore they implicitly bring out the structure of the shape. Such deformations can then be exploited to perform shape synthesis, shape reconstruction from image, shape matching, or segmentation.

This implementation introduces a fully unsupervised adversarial deep generative model where a generative neural network/generator predicts a linear basis of deformations for any 3D input. In order to learn meaningful and realistic deformations, the generator network is trained to deceive a discriminative neural network/discriminator, where the discriminator is trained to classify between training shapes and synthetic shapes. A synthetic shape is obtained from an input shape to which a random deformation is applied in the linear span of the predicted basis for this shape. Through several regularity terms, this implementation enforce that the generator does not collapse thanks to the independence of the learned deformations, and that the learned deformations are localized on the parts of the objects. The structure of the object has never been given to the model during the training, therefore the model implicitly learns by itself a meaningful structure of the input. The generator thereby learnt can be used in several applications such as intelligent 3D design tools, automatic 3D segmentation, or 3D structure discovery.

This implementation offers the following advantages:

It does not require to cluster the different kinds of 3D models to learn each category separately. On the contrary, this implementation is suited to directly learn on the whole dataset all at once, as it is easier to learn deformations than generating the shape from the ground-up.

The synthetic shapes than can be obtain by using the learnt generator are realist, as an existing shape is deformed.

A linear basis of deformations is learnt that can be used in real-time applications.

There is no constraint on the deformation by any deformation handle, the deformations are free-form.

The generator learns better deformations thanks to the adversarial training.

The structures learned by the generator do not require any supervision during the training.

The implementation follows the pipeline shown in FIG. 1

Dataset Pre-Processing

This step implements the providing of the training dataset of 3D modeled object.

This step may consist in providing a dataset of 3D point cloud and sub-sampling them so that they all have a same number of points, the sub-sampled point clouds forming the training dataset.

Alternatively, given a dataset of 3D meshes, the pre-processing comprises centering each mesh, and rescaling them in the unit sphere. For that, the pre-processing extracts a dense point cloud from each normalized mesh in the dataset by raycasting each one on 6 orthographic views, and then uniformly sub-samples each point cloud. To do so, the pre-processing starts by a random point of the point cloud, and iteratively pick the furthest point of the point cloud from the already selected points, until a desired number of points is reached.

In yet another alternative, this step may consist in providing a dataset of 3D meshes.

For the following rest of the description of the implementation, the training dataset is considered to be a dataset of 3D point clouds all having the same number of point. But the description equally applies to a dataset of 3D meshes or to a dataset of point clouds having different number of points. Let m be the number of points common to all 3D point cloud of the dataset.

Neural Network Architecture

Let n be the size of the deformations basis. Let w,w' be the weights of the whole deep neural network (i.e. the discriminator and the generator) learnt. The generator comprises an encoder architecture $f_w$ that takes as input a 3D point cloud or a 3D mesh, and outputs a latent vector $h\in \mathbb{R}^p$, representing the input shape. Such an encoder architecture can be based on PointNet (as described for example in C. Qi, H. Su, K. Mo, L. Guibas. "*Pointnet: Deep learning on point sets for 3d classification and segmentation*", in Conference on Computer Vision and Pattern Recognition (CVPR), 2017, which is incorporated herein by reference) or its numerous extensions. Alternatively, the encoder architecture may use mesh topology (i.e. if the 3D modeled objects of the dataset are 3D meshes), for example as done in MeshCNN (as described for example in R. Hanocka, A. Hertz, N. Fish, R. Giryes, S. Fleishman, D. Cohen-Or, "*Meshcnn: A network with an edge*", In SIGGRAPH, 2019, which is incorporated herein by reference), in case the inputs are meshes instead of point clouds. In other words, $f_w$ is designed to take as input a mesh x or its sampled point cloud.

In addition to $f_w$, the generator comprises a deep feedforward neural network $g_w$ that takes as input the latent vector h of a shape, as well as a 3D point p, and outputs its deformation basis $g_w(h,p)=(u_1,\ldots,u_n)\in \mathbb{R}^{n\times 3}$, at the point p.

To further simplify the notations, let $g_w(h,X)_j$, $j\in \{1,\ldots,n\}$, be the vector $$\begin{pmatrix} g_w(h,\,X_1)_j \\ \vdots \\ g_w(h,\,X_m)_j \end{pmatrix} \in \mathbb{R}^{m\times 3},$$

for any point cloud or mesh $X \in \mathbb{R}^{m \times 3}$ containing m points or vertices. Thus, $g_w(h, X) \in \mathbb{R}^{n \times (m \times 3)}$ is the basis computed at all points of X.

Besides, the basis in $g_w$ is normalized (i.e. the implementation comprises a step of normalizing the basis) such that $\|u_j\|_{2,\infty}=1$ for all basis vectors $u_j$, where $\|u_j\|_{\infty, 2}$ is defined as $$\left\| \begin{pmatrix} \|g_w(h, X_1)_j\|_2 \\ \vdots \\ \|g_w(h, X_m)_j\|_2 \end{pmatrix} \right\|_\infty.$$

This normalization makes each vector basis to have its maximum 3D amplitude at each 3D point to be 1. Thus, whatever are amplitudes at different points are, the maximal amplitude will always be the same for any basis vector.

The discriminator is noted $d_w$, and takes as input a shape and outputs the probability that this shape is a real/realist one or a synthetic one.

Training

The learning according to this implementation learns all the networks $d_w$, $f_w$ and $g_w$ by mini-batch stochastic gradient descent (or any other mini-batch stochastic optimization), using adversarial training, by alternatively minimizing two energies $E_1$ and $E_2$ for each mini-batch of N inputs $x_1, \ldots, x_N$.

For each input $x_i$ in the mini-batch, the learning according to this implementation comprises a random sampling of a deformation in the span of the deformations basis predicted for the input $x_i$. To do so, the sampling samples the coefficients of the linear combination $\alpha^i \in \mathbb{R}^n$. Several distributions can be used for the sampling. For example, the following distributions can be used:

- the indices of the non-zero coefficients p are sampled with a Bernoulli distribution on each index;
- for each non-zero coefficient, its sign is sampled with another Bernoulli distribution;
- for each non zero-coefficient, its amplitude is sampled with a centered Gaussian distribution The resulting deformed shape is then:

$$y_i = x_i + \sum_{j=1}^n \alpha^i_j g_w(f_w(x_i), x_i)_j.$$

This shape $y_i$ may be referred to as a "synthetic shape", because it has been generated by the generator.

For each mini-batch, the learning according to this implementation minimizes the two following losses:

The discriminator/discriminative loss:

$$E_1 = \sum_{i=1}^N -\log(d(x_i)) - \log(1 - d(y_i))$$

The generator/generative loss $$E_2 = \sum_{i=1}^N \log(1 - d(y_i)) - \frac{\lambda}{m} D_{CH}(x_i, y_i) +$$

-continued $$\gamma + \frac{\delta}{mn} \sum_{j=1}^n \left\| \begin{pmatrix} \|g_w(h, x_{i,1})_j\|_2 \\ \vdots \\ \|g_w(h, x_{i,m})_j\|_2 \end{pmatrix} \right\|_1 + \gamma \text{ independance term}$$

The minimization can minimize $E_1$ for several mini-batches before minimizing $E_2$, i.e. a strict alternance between the two minimizations is not forced. Any technique dedicated to improve the training of GANs, as discussed in T. Salimans, I. Goodfellow, W. Zaremba, V. Cheung, A. Radford, X. Chen, "*Improved Techniques for Training GANs*", In NeurIPS, 2016, can be used. For example, the logarithm can be changed with a least squares to make the gradients of the discriminator stronger. The batch may be normalized.

$D_{CH}(x,y)$ is the Chamfer 3D distance, measuring the distance between two point clouds:

$$D_{CH}(x, y) = \sum_{p \in x} \min_{q \in y} \|p - q\|_2^2 + \sum_{q \in y} \min_{p \in x} \|p - q\|_2^2.$$

Maximizing the Chamfer distance between the source and the deformed shape ensures that the deformed shape is different from the input, and therefore helps to prevent any collapsing of the generator.

The term $$\left\| \begin{pmatrix} \|g_w(h, X_1)_j\|_2 \\ \vdots \\ \|g_w(h, X_m)_j\|_2 \end{pmatrix} \right\|_1$$

is a group sparsity loss, in J. Mairal, F. Bach, J. Ponce, "*Sparse Modeling for Image and Vision Processing*", New Foundations and Trends, 2014, which is incorporated herein by reference. It is a term that enforces the deformations to localize on the parts of the object in a fully unsupervised way, without even knowing the structure of the object. Indeed, it forces the amplitudes of each deformation to be sparse. The most efficient way for the generator to learn plausible deformations which are sparse is to localize the deformations on the parts of the object, since a sparse deformation cannot involve too many vertices, and a deformation that would move only some but not all vertices of a part could not be realistic.

The independence term is any terms which prevents the deformations to be redundant. The term may be an orthogonality loss, such as $$\|g_w(f_w(x_i),x_i)g_w(f_w(x_i),x_i)^T - Id_{n \times n}\|_2$$

or, alternatively, the term may enforce each deformation to be orthogonal to the other at each point (notice that such a constraint mathematically imposes that no more than 3 deformation vectors of the basis can be non-zero at each point), for example by being of the type:

$$\sum_{i=1}^N \sum_{k=1}^m \sum_{1 \leq j < l \leq n} |g_w(h, x_{i,k})_j^T g_w(h, x_{i,k})_l|.$$

The generator loss may further comprise any other regularization terms, like a Laplacian loss to enforce the Laplacian coordinates to be conserved on the deformed shape, as discussed in W. Wang, D. Ceylan, R. Mech, U. Neumann, "*3dn: 3d deformation network*", In Conference on Computer Vision and Pattern Recognition (CVPR), 2019.

With reference to FIGS. 2 to 13, it is now discussed examples of deformations that can be obtained with deformation basis generated by the generative neural network learnt according to the previously-discussed implementation. In these examples, the training dataset consisted in a dataset of 3D point clouds obtained from the ShapeNet-Core.V2 dataset.

Figure 2:
Figure 3:

FIG. 2 shows an input 3D modeled object representing a chair. FIG. 3 shows a deformation of the chair of FIG. 2. The deformation corresponds to a single vector of the deformation basis generated by the generative neural network when applied to the chair of FIG. 2. The deformation shown in FIG. 3 deforms the arms of the chair only, which shows that it is localized on the arms.

Figure 4:
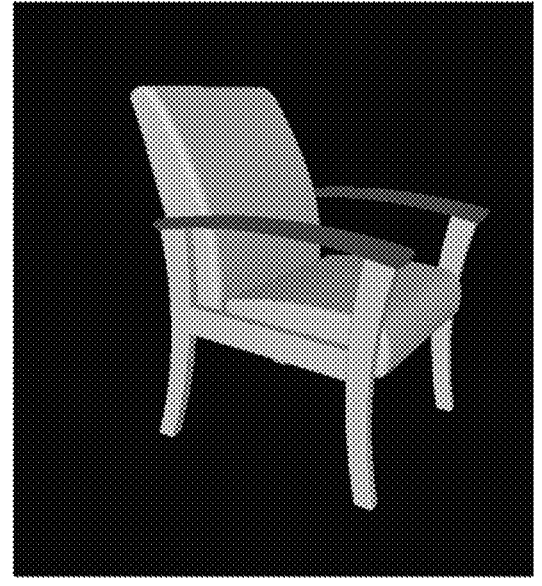
Figure 5:

FIG. 4 shows an input 3D modeled object representing a chair. FIG. 5 shows a deformation of the chair of FIG. 4. The deformation corresponds to a single vector of the deformation basis generated by the generative neural network when applied to the chair of FIG. 4. The deformation shown in FIG. 5 deforms the back of the chair only, which shows that it is localized on the back.

Figure 6:
Figure 7:
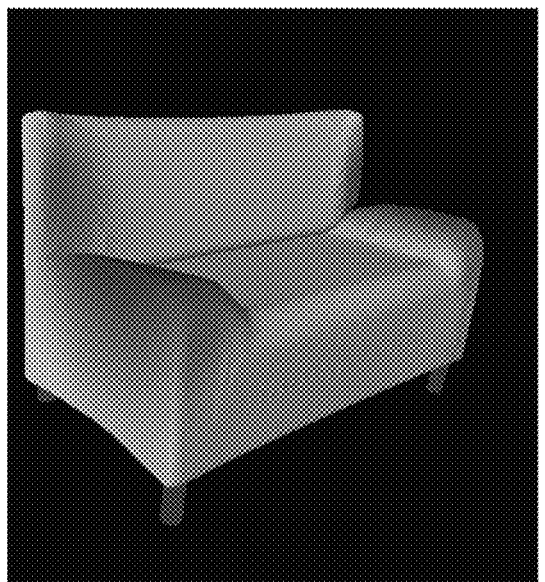

FIG. 6 shows an input 3D modeled object representing a couch. FIG. 7 shows a deformation of the couch of FIG. 6. The deformation corresponds to a single vector of the deformation basis generated by the generative neural network when applied to the couch of FIG. 6. The deformation shown in FIG. 7 deforms the sides of the couch only, which shows that it is localized on the sides.

Figure 8:
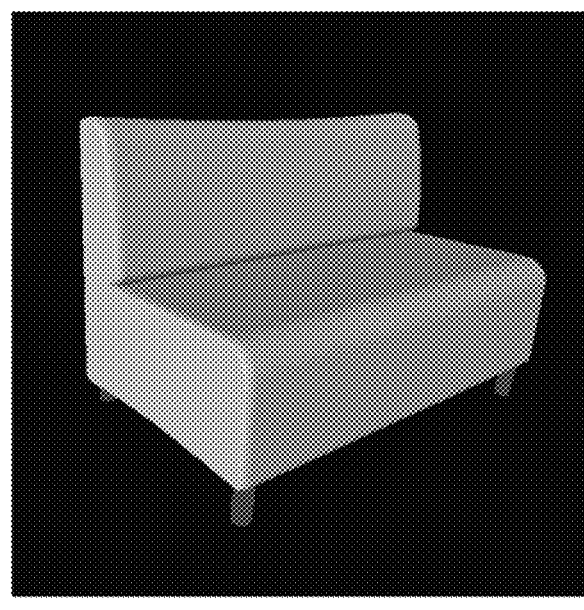
Figure 8:
Figure 9:
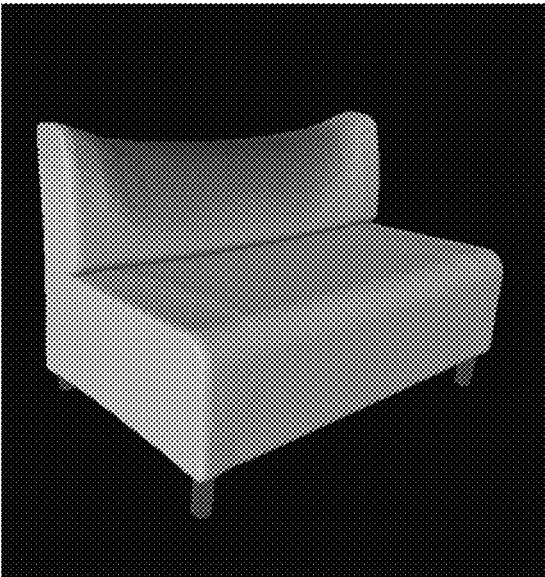

FIG. 8 shows an input 3D modeled object representing a couch. FIG. 9 shows a deformation of the couch of FIG. 8. The deformation corresponds to a single vector of the deformation basis generated by the generative neural network when applied to the couch of FIG. 8. The deformation shown in FIG. 9 deforms the back of the couch only, which shows that it is localized on the back.

Figures 10, 11, 12, 13:
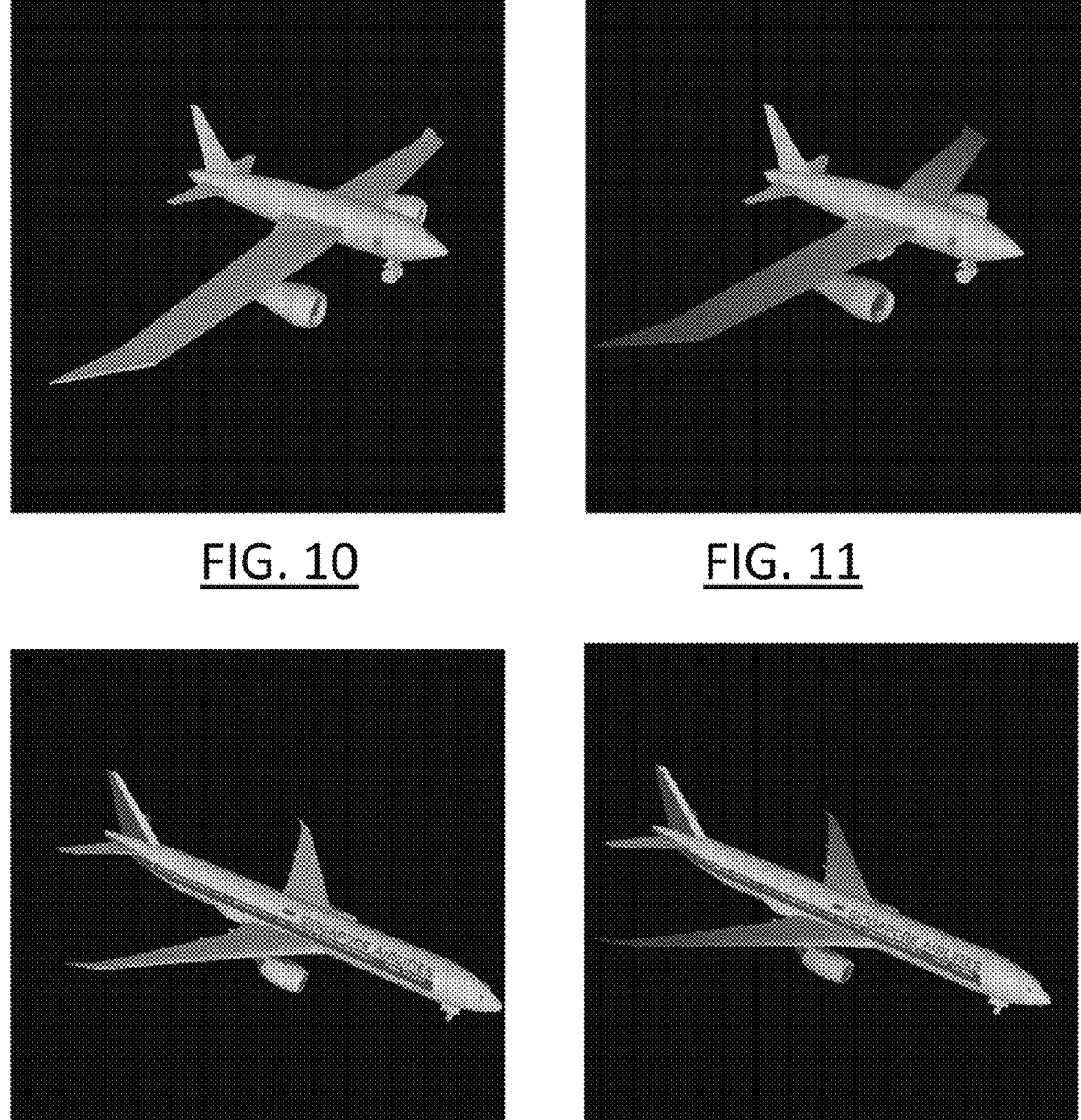

FIG. 10 shows an input 3D modeled object representing a plane. FIG. 11 shows a deformation of the plane of FIG. 10. The deformation corresponds to a single vector of the deformation basis generated by the generative neural network when applied to the plane of FIG. 10. The deformation shown in FIG. 11 deforms the wings, and the engines attached thereof, of the plane only, which shows that it is localized on the wings.

FIG. 12 shows an input 3D modeled object representing a plane. FIG. 13 shows a deformation of the plane of FIG. 12. The deformation corresponds to a single vector of the deformation basis generated by the generative neural network when applied to the plane of FIG. 12. The deformation shown in FIG. 13 deforms the wings, and the engines attached thereof, of the plane only, which shows that it is localized on the wings.

It is also provided a generative neural network learnable according to the learning method, e.g. a generative neural network having been learnt by the learning method. The generative neural network forms a computer-implemented data structure having layers of neurons with weights (also referred to as parameters) of which values are settable (e.g. have been set) by the learning according to the learning method.

It is further provided a computer-implemented method of use of the generative neural network. The method of use comprises applying the generative neural network to an input 3D modeled object, thereby yielding a deformation basis of the input 3D modeled object.

The method of use may be for 3D editing, also referred to as shape synthesis. In this case, the method of use comprises one or more applications of the generative neural network each on a respective input 3D modeled object to obtain a respective deformation basis of the input object. For each respective deformation basis, the method of use then comprises forming a linear combination of the deformation basis, thereby yielding a linear deformation of the input 3D modeled object.

In an example of the method of use for 3D editing, the method of use comprises:

providing a first 3D modeled object;

starting from the first 3D modeled object, one or more iterations of:

applying the generative neural network to a previous deformation of the first 3D modeled object to obtain a deformation basis of said previous deformation;

forming a linear combination of the deformation basis, thereby yielding a next deformation of the first 3D modeled object.

In this example, the method of use performs iterative linear deformations of the first 3D modeled object, which ultimately yield a non-linear deformation of the first 3D modeled object into a second 3D modeled object. The method of use of this example may be any method for deforming a 3D modeled object/determining a 3D modeled object deformation that uses a deformation basis iteratively as described above.

The method of use may alternatively be for depth-frame reconstruction. The depth frame reconstruction comprises providing a 3D mesh and a depth map of another object. The other object is close to the provided 3D mesh. The depth frame reconstruction comprises then applying the generative neural network to the 3D mesh, which yields a deformation basis of the 3D mesh. The depth frame reconstruction uses this deformation basis to deform the provided 3D mesh into the another object represented by the depth map. The depth frame reconstruction then further comprises an optimization over the deformation basis to fit the depth map, i.e. the depth frame reconstruction comprises optimizing coefficients of a linear combination of the deformation basis vector so that deforming the 3D mesh by the linear combination fits the depth map. The aim of the reconstruction is to obtain a 3D modeled object corresponding to the depth map.

The method of use may alternatively be for shape reconstruction from an image, which works in a similar manner than the previously-described use for the depth-frame reconstruction, but with the difference that the depth map is replaced by an image. Said previously-described use may have to be modified to better account for the fact that a 2D view may feature ambiguity (e.g. due to lack of 3D information). An additional regularization may be required, as known per se.

The method of use may alternatively be shape matching. The shape matching comprises providing two close 3D meshes $e_1$ and $e_2$. The shape matching then comprises computing, by applying the generative neural network, a deformation basis of the first 3D mesh $e_1$, and optimizing coefficients of a linear combination of the deformation basis vector in order to deform the first 3D mesh $e_1$ so that it matches the second 3D mesh $e_2$. For example, the shape matching may compute:

$$e_1 + \sum_{j=1}^{n} \hat{\alpha}_r g_w(f_w(e_1), p_i)_j$$

-continued where $$(\widehat{\alpha_1}, \ldots, \widehat{\alpha_p}) = \underset{\alpha_1, \ldots, \alpha_p}{\operatorname{argmin}} \ d_{CH}\left(p_1 + \sum_{j=1}^{n}\alpha_j g_w(f_w(e_1), p_1)_j, p_2\right),$$

where $p_1$ is a point cloud sampled from $e_1$ and where $p_2$ is a point cloud sampled from $e_2$.

The method of use may alternatively be for segmentation. In this case, the method of use comprises:

providing a 3D modeled object;

applying the generative neural network to the 3D modeled object, thereby yielding a deformation basis of the 3D modeled object consisting of vectors each representing a local deformation of the 3D modeled object;

determining local parts of the 3D modeled object by (e.g. automatically) inferring a respective local part for each vector of the basis, by (e.g. automatically):

for each vector, deforming the object according to the vector multiplied by a unitary (i.e. common to all vectors) amplitude/coefficient;

for each unitary deformation, determining the points/ vertices of the 3D modeled object which have been deformed above a predefined threshold, the determined points forming a segment of the segmentation of the 3D modeled object, the method of use thereby (e.g. automatically) segmenting the 3D modeled object.

In other words, as the deformation basis vectors are localized on the parts of the input 3D modeled object as previously explained, they can be used to extract the structure of the input 3D modeled object.

The method of use may also be for 3D structure discovery: as each deformation vector forms a deformation localized on a part of the object, the knowledge of a deformation vector allows to obtain knowledge of the local parts of the object (i.e. in case they were not known beforehand), which yields the 3D structure of the object.

The learning method and the method of use may be performed independently. Alternatively, they may be integrated into a same computer-implemented process for 3D object deformation, the process integrating the methods, i.e. comprising first the learning method and then the method of use.

The methods are computer-implemented. This means that steps (or substantially all the steps) of the methods are executed by at least one computer, or any system alike. Thus, steps of the methods are performed by the computer, possibly fully automatically, or, semi-automatically. In examples, the triggering of at least some of the steps of the methods may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

Figure 14:
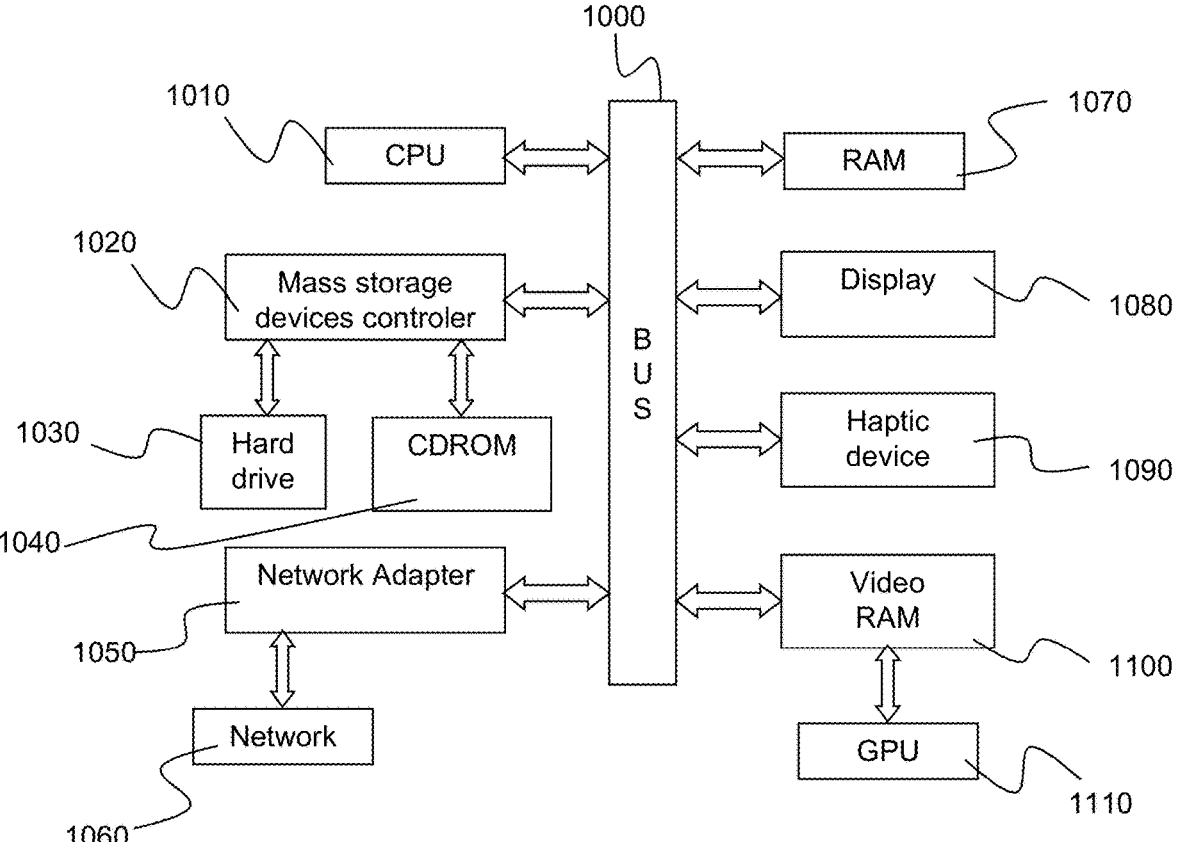
FIG. 14 shows an example of the system.

FIG. 14 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform one or more of the methods. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method(s) by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method(s).

The invention claimed is:

1. A computer-implemented method of machine-learning, the method comprising:

obtaining a dataset of 3D modeled objects representing real-world objects; and learning, based on the dataset, a generative neural network configured for generating a deformation basis of an input 3D modeled object, the learning including an adversarial training, the deformation basis being a set of vectors each being a direction of deformation of the input 3D modeled object such that the vectors are linearly combined to form a linear deformation of the input 3D modeled object, wherein the method further includes performing one or more of:

a depth frame reconstruction process by deformation of a 3D mesh to fit a depth map, the depth frame reconstruction process including:

obtaining the 3D mesh, the 3D mesh representing a first real-world object, obtaining the depth map, the depth map being obtained from depth physical measurements on a second real-world object and representing the second real-world object, the second real-world object being close to the first real-world object, applying the generative neural network to the 3D mesh, which yields a deformation basis of the 3D mesh, optimizing coefficients of a linear combination of the deformation basis vector so that deforming the 3D mesh by the linear combination fits the depth map; and/or a shape reconstruction process from a digital image by deformation of a 3D mesh to fit the digital image, the shape reconstruction process including:

obtaining the 3D mesh, the 3D mesh representing a first real-world object, obtaining a digital image of a second real-world object, the second real-world object being close to the first real-world object, applying the generative neural network to the 3D mesh, which yields a deformation basis of the 3D mesh, optimizing coefficients of a linear combination of the deformation basis vector so that deforming the 3D mesh by the linear combination fits the digital image; and/or a shape matching process by deformation of a first 3D modeled object to fit a second 3D modeled object, the shape matching process including:

obtaining the first 3D modeled object and the second 3D modeled object, the second 3D modeled object being obtained from a scan of a real-world object, applying the generative neural network to the first 3D modeled object to compute a deformation basis of the first 3D modeled object, and optimizing coefficients of a linear combination of the deformation basis vectors in order to deform the first 3D modeled object so that it matches the second 3D modeled object; and/or a segmentation process of segmentation of a 3D modeled object representing a scanned real-world object, the segmentation process including:

obtaining, from a physical scan of the real-world object, the 3D modeled object, the 3D modeled object corresponding to scan data representing the real-world object, applying the generative neural network to the 3D modeled object, thereby yielding a deformation basis of the 3D modeled object consisting of vectors each representing a local deformation of the 3D modeled object, and determining local parts of the 3D modeled object by inferring a respective local part for each vector of the basis, by:

for each vector, deforming the object according to the vector multiplied by a unitary coefficient, and for each unitary deformation, determining points/vertices of the 3D modeled object which have been deformed above a predefined threshold, the determined points forming a segment of the segmentation of the 3D modeled object, wherein a generative loss is of a type:

$$E_2 = \sum_{i=1}^{N} \log(1 - d(y_i)) - \frac{\lambda}{m} D_{CH}(x_i, y_i) + \frac{\delta}{mn} \sum_{j=1}^{n} \left\| \begin{pmatrix} \|g_w(h, x_{i,1})_j\|_2 \\ \vdots \\ \|g_w(h, x_{i,m})_j\|_2 \end{pmatrix} \right\|_1,$$

where:

d is a discriminative neural network;

$x_1, \ldots, x_N$ are 3D modeled objects forming a mini-batch of the dataset, N being a number of objects in the mini-batch;

$$\begin{pmatrix} g_w(h, x_{i,1})_j \\ \vdots \\ g_w(h, x_{i,m})_j \end{pmatrix}, 1 \le j \le n,$$

is the deformation basis generated by the generative neural network at object $x_i$, n being a number of vectors of the deformation basis, $x_{i,1} \ldots x_{i,m}$ being points or vertices of $x_i$;

m is a number of points or vertices of each 3D modeled object of the mini-batch;

$y_i$ is a linear deformation of $x_i$ spanned by the deformation basis generated by the generative neural network at object $x_i$;

$D_{CH}$ is a Chamfer distance; and

λ and δ are parameters of the generative loss.

2. The computer-implemented method of claim 1, wherein the method further includes training, by minimizing a discriminative loss, the discriminative neural network configured for determining whether or not a 3D modeled object resulting from application of a linear combination of a deformation basis generated by the generative neural network is realistic or synthetic.

3. The computer-implemented method of claim 2, wherein the learning of the generative neural network further includes training the generative neural network to fool the discriminative neural network.

4. The computer-implemented method of claim 2, wherein the learning of the generative neural network further includes minimizing the generative loss, the method alternating minimizations of the generative loss and minimizations of the discriminative loss.

5. The computer-implemented method of claim 4, wherein a minimization of the discriminative loss is based on random linear combinations of deformation basis generated by the generative neural network.

6. The method of claim 5, wherein the learning is carried out mini-batch by mini-batch, and wherein for each mini-batch, the learning includes, for each 3D modeled object of the mini-batch, generating a random linear combination of the deformation basis of the 3D modeled object generated by the generative neural network, by randomly sampling coefficients of the linear combination.

7. The method of claim 6, wherein the random sampling includes a random sampling of a number of non-zero coefficients and/or, for each non-zero coefficient, a random sampling of a coefficient value according to a pseudo-bounded probability distribution.

8. The method of claim 4, wherein the generative loss includes a term rewarding fooling of the discriminative neural network by a linear combination of the deformation basis generated by the generative neural network.

9. The method of claim 8, wherein the generative loss further includes a term rewarding a disparity between an input 3D modeled object and a linear deformation of the input 3D modeled object spanned by the deformation basis generated by the generative neural network.

10. The method of claim 8, wherein the generative loss further includes a term rewarding sparsity of the deformation basis generated by the generative neural network.

11. A computer-implemented method of applying a generative neural network learned according to machine-learning, the method comprising:

applying the generative neural network including using the learned generative neural network by performing one or any combination of the following:

a depth frame reconstruction process by deformation of a 3D mesh to fit a depth map, the depth frame reconstruction process including:

obtaining the 3D mesh, the 3D mesh representing a first real-world object, obtaining the depth map, the depth map being obtained from depth physical measurements on a second real-world object and representing the second real-world object, the second real-world object being close to the first real-world object, applying the generative neural network to the 3D mesh, which yields a deformation basis of the 3D mesh, optimizing coefficients of a linear combination of the deformation basis vector so that deforming the 3D mesh by the linear combination fits the depth map; and/or a shape reconstruction process from a digital image by deformation of a 3D mesh to fit the digital image, the shape reconstruction process including:

obtaining the 3D mesh, the 3D mesh representing a first real-world object, obtaining a digital image of a second real-world object, the second real-world object being close to the first real-world object, applying the generative neural network to the 3D mesh, which yields a deformation basis of the 3D mesh, optimizing coefficients of a linear combination of the deformation basis vector so that deforming the 3D mesh by the linear combination fits the digital image; and/or a shape matching process by deformation of a first 3D modeled object to fit a second 3D modeled object, the shape matching process including:

obtaining the first 3D modeled object and the second 3D modeled object, the second 3D modeled object being obtained from a scan of a real-world object, applying the generative neural network to the first 3D modeled object to compute a deformation basis of the first 3D modeled object, and optimizing coefficients of a linear combination of the deformation basis vectors in order to deform the first 3D modeled object so that it matches the second 3D modeled object; and/or a segmentation process of segmentation of a 3D modeled object representing a scanned real-world object, the segmentation process including:

obtaining, from a physical scan of the real-world object, the 3D modeled object, the 3D modeled object corresponding to scan data representing the real-world object, applying the generative neural network to the 3D modeled object, thereby yielding a deformation basis of the 3D modeled object consisting of vectors each representing a local deformation of the 3D modeled object, and determining local parts of the 3D modeled object by inferring a respective local part for each vector of the basis, by:

for each vector, deforming the object according to the vector multiplied by a unitary coefficient, and for each unitary deformation, determining points/vertices of the 3D modeled object which have been deformed above a predefined threshold, the determined points forming a segment of the segmentation of the 3D modeled object, wherein a generative loss is of a type:

$$E_2 = \sum_{i=1}^{N} \log(1 - d(y_i)) - \frac{\lambda}{m} D_{CH}(x_i, y_i) + \frac{\delta}{mn} \sum_{j=1}^{n} \left\| \begin{matrix} \|g_w(h, x_{i,1})_j\|_2 \\ \vdots \\ \|g_w(h, x_{i,m})_j\|_2 \end{matrix} \right\|_1,$$

where:

d is a discriminative neural network;

$x_1, \ldots, x_N$ are 3D modeled objects forming a mini-batch of the dataset, N being a number of objects in the mini-batch;

$$\begin{pmatrix} g_w(h, x_{i,1})_j \\ \vdots \\ g_w(h, x_{i,m})_j \end{pmatrix},$$

$1 \leq j \leq n$, is the deformation basis generated by the generative neural network at object $x_i$, n being a number of vectors of the deformation basis, $x_{i,1} \ldots x_{i,m}$ being points or vertices of $x_i$;

m is a number of points or vertices of each 3D modeled object of the mini-batch;

$y_i$ is a linear deformation of $x_i$ spanned by the deformation basis generated by the generative neural network at object $x_i$;

$D_{CH}$ is a Chamfer distance; and $\lambda$ and $\delta$ are parameters of the generative loss, and wherein the machine-learning includes:

obtaining a dataset of 3D modeled objects representing real-world objects; and learning, based on the dataset, the generative neural network configured for generating a deformation basis of an input 3D modeled object, the learning includes an adversarial training.

12. A device comprising:

a processor; and a non-transitory data storage medium having recorded thereon a computer program comprising instructions for machine-learning that when executed with a processor causes the processor to be configured to:

obtain a dataset of 3D modeled objects representing real-world objects, and learn, based on the dataset, a generative neural network configured for generating a deformation basis of an input 3D modeled object, the learning comprising an adversarial training, the deformation basis being a set of vectors each being a direction of deformation of the input 3D modeled object such that the vectors are linearly combined to form a linear deformation of the input 3D modeled object, wherein the processor is further configured to perform one or more of:

a depth frame reconstruction process by deformation of a 3D mesh to fit a depth map, the depth frame reconstruction process causing the processor to be configured to:

obtain the 3D mesh, the 3D mesh representing a first real-world object, obtain the depth map, the depth map being obtained from depth physical measurements on a second real-world object and representing the second real-world object, the second real-world object being close to the first real-world object, apply the generative neural network to the 3D mesh, which yields a deformation basis of the 3D mesh, optimize coefficients of a linear combination of the deformation basis vector so that deforming the 3D mesh by the linear combination fits the depth map; and/or a shape reconstruction process from a digital image by deformation of a 3D mesh to fit the digital image, the shape reconstruction process causing the processor to be configured to:

obtain the 3D mesh, the 3D mesh representing a first real-world object, obtain a digital image of a second real-world object, the second real-world object being close to the first real-world object, apply the generative neural network to the 3D mesh, which yields a deformation basis of the 3D mesh, optimize coefficients of a linear combination of the deformation basis vector so that deforming the 3D mesh by the linear combination fits the digital image; and/or a shape matching process by deformation of a first 3D modeled object to fit a second 3D modeled object, the shape matching process causing the processor to be configured to:

obtain the first 3D modeled object and the second 3D modeled object, the second 3D modeled object being obtained from a scan of a real-world object, apply the generative neural network to the first 3D modeled object to compute a deformation basis of the first 3D modeled object, and optimize coefficients of a linear combination of the deformation basis vectors in order to deform the first 3D modeled object so that it matches the second 3D modeled object; and/or a segmentation process of segmentation of a 3D modeled object representing a scanned real-world object, the segmentation process causing the processor to be configured to:

obtain, from a physical scan of the real-world object, the 3D modeled object, the 3D modeled object corresponding to scan data representing the real-world object, apply the generative neural network to the 3D modeled object, thereby yielding a deformation basis of the 3D modeled object consisting of vectors each representing a local deformation of the 3D modeled object, and determine local parts of the 3D modeled object by inferring a respective local part for each vector of the basis, by the processor being configured to:

for each vector, deform the object according to the vector multiplied by a unitary coefficient, and for each unitary deformation, determine points/vertices of the 3D modeled object which have been deformed above a predefined threshold, the determined points forming a segment of the segmentation of the 3D modeled object, wherein a generative loss is of a type:

$$E_2 = \sum_{i=1}^{N} \log(1 - d(y_i)) - \frac{\lambda}{m} D_{CH}(x_i, y_i) + \frac{\delta}{mn} \sum_{j=1}^{n} \left\| \begin{array}{c} \|g_w(h, x_{i,1})_j\|_2 \\ \vdots \\ \|g_w(h, x_{i,m})_j\|_2 \end{array} \right\|_1,$$

where:

d is a discriminative neural network;

$x_1, \ldots, x_N$ are 3D modeled objects forming a mini-batch of the dataset, N being a number of objects in the mini-batch;

$$\begin{pmatrix} g_w(h, x_{i,1})_j \\ \vdots \\ g_w(h, x_{i,m})_j \end{pmatrix},$$

$1 \le j \le n$, is the deformation basis generated by the generative neural network at object $x_i$, n being a number of vectors of the deformation basis, $x_{i,1} \ldots x_{i,m}$ being points or vertices of $x_i$;

m is a number of points or vertices of each 3D modeled object of the mini-batch;

$y_i$ is a linear deformation of $x_i$ spanned by the deformation basis generated by the generative neural network at object $x_i$;

$D_{CH}$ is a Chamfer distance; and $\lambda$ and $\delta$ are parameters of the generative loss, and/or apply the generative neural network learned according to the machine-learning.

13. The device of claim 12, wherein the machine-learning further includes training, by minimizing a discriminative loss, the discriminative neural network configured for determining whether or not a 3D modeled object resulting from application of a linear combination of a deformation basis generated by the generative neural network is realistic or synthetic.

14. The device of claim 13, wherein the learning of the generative neural network further includes training the generative neural network to fool the discriminative neural network.

15. The device of claim 13, wherein the learning of the generative neural network further includes minimizing the generative loss, and the processor is further configured to alternate minimizations of the generative loss and minimizations of the discriminative loss.

16. The computer-implemented method of claim 11, wherein the machine-learning further includes training, by minimizing a discriminative loss, the discriminative neural network configured for determining whether or not a 3D modeled object resulting from application of a linear combination of a deformation basis generated by the generative neural network is realistic or synthetic.

17. The computer-implemented method of claim 16, wherein the learning of the generative neural network further includes training the generative neural network to fool the discriminative neural network.

18. The computer-implemented method of claim 16, wherein the learning of the generative neural network further includes minimizing the generative loss, the method alternating minimizations of the generative loss and minimizations of the discriminative loss.

19. A non-transitory computer readable medium having stored thereon a program that when executed by a computer causes the computer to implement the method of claim 1.

* * * * *